United States Patent [19]

Fremont

[11] Patent Number: 4,755,875
[45] Date of Patent: Jul. 5, 1988

[54] TELECINE APPARATUS INCLUDING AN ELECTRO-OPTICAL IMAGE TRANSDUCER ILLUMINATED BY A BIAS LIGHT SOURCE

[75] Inventor: Andrew de M. Fremont, Chelmsford, England

[73] Assignee: The Marconi Company Limited, Stanmore, England

[21] Appl. No.: 826,206

[22] Filed: Feb. 5, 1986

[30] Foreign Application Priority Data

Mar. 7, 1985 [GB] United Kingdom ............... 8505852

[51] Int. Cl.$^4$ ............................................. H04N 5/253
[52] U.S. Cl. ...................................... 358/214; 358/223
[58] Field of Search ............... 358/214, 209, 215, 216, 358/223

[56] References Cited

U.S. PATENT DOCUMENTS

| | | | |
|---|---|---|---|
| 2,579,971 | 12/1951 | Schade | 178/5.4 |
| 3,718,752 | 2/1973 | Katsuta et al. | 178/5.4 TC |
| 4,080,624 | 3/1978 | Ando et al. | 358/55 |
| 4,359,759 | 11/1982 | McBride et al. | 358/111 |

FOREIGN PATENT DOCUMENTS

| | | | |
|---|---|---|---|
| 55-70186 | 5/1980 | Japan | 358/223 |
| 56-44273 | 4/1981 | Japan | 358/213 |

Primary Examiner—Jin F. Ng
Assistant Examiner—Stephen Brinich
Attorney, Agent, or Firm—Spencer & Frank

[57] ABSTRACT

A telecine apparatus uses a line array electro-optical image transducer which is illuminated with bias light in addition to the projection light passing through the film. The bias light serves to operate the transducer on a linear portion of its characteristic, and the bias light is pulsed on during the integration periods of the transducer so as to give an accurate and reproducible control of the bias value. The transducer itself has a controllable variable integration period.

4 Claims, 1 Drawing Sheet

TELECINE APPARATUS INCLUDING AN ELECTRO-OPTICAL IMAGE TRANSDUCER ILLUMINATED BY A BIAS LIGHT SOURCE

BACKGROUND OF THE INVENTION

This invention relates to a telecine apparatus in which a video signal representative of picture information on a cinematographic film is generated, usually for subsequent use with a televison system. In such apparatus, light passing through image frames of the film is received by an electro-optical converter which generates an electrical signal in response thereto. The response characteristic of typical electro-optical converters is non-linear at very low light levels, and it has been proposed to shine a bias light on to the converter in addition to the image light so as to operate the converter on a more linear portion of its characteristic. To allow for variations in film density and film transport speeds and the like, it can be necessary to vary the strength of the light which illuminates the film and it is difficult to adjust the bias light in correspondence with such a variation so that the electrical video signal generated has uniform characteristics which result in the reproduction of television pictures having consistent quality with the correct black shading and contrast etc. The present invention seeks to provide an improved telecine apparatus.

SUMMARY OF THE INVENTION

According to this invention a telecine apparatus includes a line array electro-optical image transducer having a recurring light integration period and which is adapted to receive light representing images on a cinematographic film; a bias light source for directly illuminating the image transducer; and means for operating the bias light source in a pulsed manner to control the amount of bias light falling upon the transducer in each integration period.

By varying the duration of the integration period, allowance can be made for variations in film density and frame transport rates, but in order to preserve a required line repetition rate for the output video signal the effective integration period will in general be less than the line period. This gives scope to vary the integration period by substantial amounts, as this period cannot meaningfully exceed the line period. This results in a period of time during which the sensor is not responsive to light, and accordingly the application of bias light during this period is of no effect. Therefore it is the amount of bias light falling upon the sensor during the integration period which is of importance. Although in principle the amount of bias light could be controlled by varying the intensity of the bias light source, this is impracticable, as the required degree of accuracy would be difficult to achieve, and the control circuits would be of some complexity. Conveniently, the light bias source is pulsed on only during the integration periods of the image sensor, and to avoid the need to include any variation in the brightness of the light bias source, it has a preset brightness which is sufficient to provide the required level of light bias during the shortest integration period which might be needed.

BRIEF DESCRIPTION OF THE DRAWINGS

The invention is further described by way of example, with reference to the accompanying drawings, in which.

DESCRIPTION OF THE PREFERRED EMBODIMENT

Figure 1:
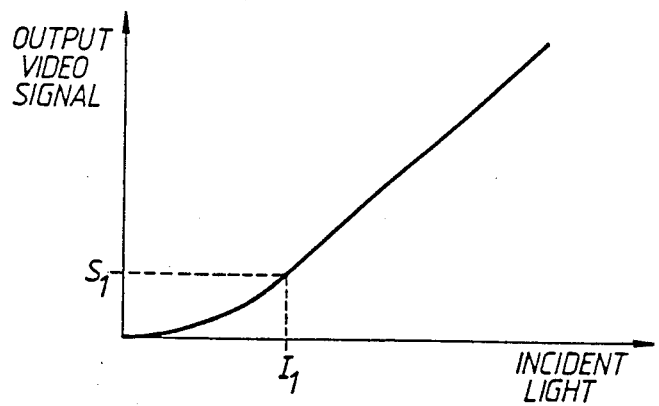
FIG. 1 is an explanatory diagram illustrating the sensitivity of a light transducer.

A telecine apparatus operates by converting the image present in the emulsion of cinematographic film to a video signal of the kind which is compatible with television systems, that is to say, it consists of elements of signals arranged in a line and field format. It is becoming customary to use what are termed line array telecine transducers which receive the optical image of successive stripes of each frame of the film, and each stripe is converted by the telecine apparatus into a corresponding line signal which can then form part of a standard television signal. In practice, the optical image of a cinematographic film has an extremely wide dynamic range both in terms of color and intensity and it is necessary to organize the telecine apparatus such that it can preserve the optical qualities of the original film. Practical electro-optical transducers, however, tend to be relatively insensitive to very low levels of light and to exhibit a linear characteristic only at higher light levels. Such a characteristic is illustrated in FIG. 1 in which the output video signal from an electro-optical transducer is plotted against incident light and ideally the electro-optical transducer is operative only upon the linear portion at which the incident light is greater than I1. This permits the output video signal to be linearly related to the intensity of incident light. In order to achieve this, a bias light having an effective intensity of I1 is projected upon the electro-optical transducer such that incident light passing through the film is superimposed upon this pedestal value. Accordingly, the electro-optical transducer always operates upon its linear region but the useful output video signal is superimposed upon a constant level S1. Once set for a particular transducer, the bias level I1 will, in general, remain constant and unaltered.

In practice, most cinematographic films include color, whereas practical electro-optical transducers are of a monochromatic nature. It is therefore necessary to separate the light, which has passed through the film, into its three primary colors and to direct this light upon three separate electro-optical transducers. In order to preserve a faithful colors balance, it is necessary that each of the three transducers have very similar characteristics, and it is therefore also necessary to ensure that their individual light bias components have the same characteristic. Cinematographic films come in very many different formats, have different transverse dimensions and frame transport rates. Of necessity, the emulsions within the film suffer wide variations of density and it is usually required to alter the illumination which is incident upon a film in order to adjust for its mean light transmissive properties. This means that, in practice, the light passing through the film will vary and it is ideally necessary to adjust the level of the light bias for all three color components to take into account this variation. Different film transport rates, and different frame formats (having different blank distances between adjacent frames) means that the effective line scanning rate of the transducer must be changed, in order to produce the required standard number of video lines per frame. Accordingly, the period during which the transducer receives light corresponding to a line of image will vary over an appreciable range depending on the film selected. As will be described subsequently, with reference to FIGS. 2 and 3, this variation is accommodated by altering the integration time of the transducer.

Figure 2:
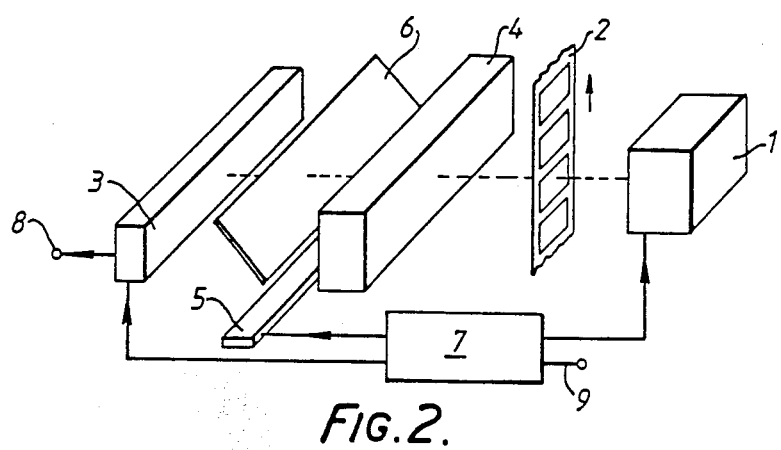
FIG. 2 is a schematic diagram of a telecine apparatus.

A telecine apparatus in accordance with the invention is illustrated very schematically in FIG. 2, in which light from a projection source 1 is passed through a cinematographic film 2 on to a line array electro-optical transducer 3, such a transducer being one having an image receiving surface in the shape of a long narrow stripe. An optical system 4 incorporating suitable lenses is interposed between the film 2 and the transducer so as to correctly form the image having the required shape, so that a line portion of a video signal can be formed therefrom. A bias light source 5 is positioned below a semi-reflecting and semi-transmissive mirror 6 which acts to combine the bias light with that passing through the optical system 4, so that the bias light falls directly upon the transducer 3; i.e. it does not pass through the film 2. Alternatively, an elongate prism can be used instead of the mirror 6 to direct the bias light on to the transducer 3. In this latter case the bias light is not combined directly with the projection light, as both are separately incident upon the transducer. This latter alternative may be the more convenient to implement. The bias light source takes the form of an elongate light emitting diode device, as such devices can be made with a light emissive surface of the desired shape, and can be pulsed on and off very rapidly. As will be explained subsequently, the light bias source is operative in a pulsed manner under the action of a control circuit 7 which is also operative to control the level of the illumination of the projection source 1 and the operating characteristics of the transducer 3.

The line array electro-optical image transducer 3 is of the kind which is operative to receive an elongate optical image corresponding to one line portion of a television picture on a linear array of light sensitive pixel elements. Light falls upon the pixel elements continuously but they are operative to accumulate an electric charge in response to the incident light only during what is termed an integration period, which can be varied over an appreciable range by the application of suitable electrical control signals. At the end of this period, the electric signal is rapidly transferred into arrays of buffer circuits so that the intregration period can be repeated for the next element of the optical image. The signals held in the buffers are then output more slowly at the video line period to constitute the required video singal. Devices having the characteristics of the image sensor are available from the Fairchild company under type No. CCD 133/134.

Figure 3:
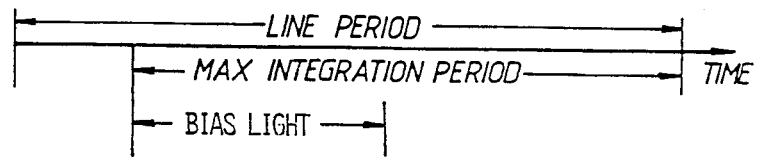
FIG. 3 is a further explanatory diagram.

As will be appreciated from FIG. 3, the light bias source 5 is operative for a short period occurring wholly within the minimum integration period of the transducer 3 which will be called for. Thus the source 5 is pulsed on at the line repetition rate. The control circuit 7 is operative to determine the duration of this period in relation to the characteristics of the illumination light source 1 and the frame transport rate of the film 2, and data representing these parameters is entered over lead 9. In this way, a video signal is generated at an output terminal 8 of the transducer 3 having optimum characteristics.

I claim:
1. A telecine apparatus comprising
   a line array electro-optical image transducer having a recurring light integration period, said image transducer receiving light representing images on a cinematographic film;
   a bias light source for directly illuminating said image transducer, said bias light source being pulsed on for a period within each light integration period for a duration which is less than said light integration period; and
   means for operating said bias light source in a pulsed manner to control the amount of bias light falling upon said transducer during each integration period.
2. An apparatus as claimed in claim 1 and wherein the transducer has a variable light integration period.
3. An apparatus as claimed in claim 1
   wherein the bias light source comprises a light emitting diode device having an elongate light emissive surface.
4. An apparatus as claimed in claim 1
   wherein the illumination from the bias light source is combined with the said light representing images on the film.

* * * * *